(12) United States Patent
Sailer et al.

(10) Patent No.: US 11,875,288 B2
(45) Date of Patent: Jan. 16, 2024

(54) DISCOVERING AND USING APPLICATION DEPLOYMENT DEPENDENCIES TO AUGMENT GOVERNANCE AND COMPLIANCE POLICY

(71) Applicant: International Business Machines Corporation, Armonk, NY (US)

(72) Inventors: Anca Sailer, Scarsdale, NY (US); Christopher John Butler, Hawthorne East (AU); Arun Kumar, Noida (IN); Malgorzata Steinder, Leonia, NJ (US); James R. Doran, New Milford, CT (US); Philippe Mulet, Saint-Nazaire (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/541,864

(22) Filed: Dec. 3, 2021

(65) Prior Publication Data

US 2023/0177426 A1    Jun. 8, 2023

(51) Int. Cl.
*G06Q 10/0631* (2023.01)
*G06F 8/60* (2018.01)
*G06F 8/20* (2018.01)

(52) U.S. Cl.
CPC ......... *G06Q 10/06313* (2013.01); *G06F 8/22* (2013.01); *G06F 8/60* (2013.01)

(58) Field of Classification Search
CPC .......... G06Q 10/0613; G06F 8/22; G06F 8/60
USPC ................................................. 717/102–122
See application file for complete search history.

(56) References Cited

U.S. PATENT DOCUMENTS

| 8,006,223 B2 * | 8/2011 | Boulineau ........ G06Q 10/06313 705/7.29 |
| 8,055,527 B1 * | 11/2011 | Gil ........................... G06Q 10/06 705/7.23 |
| 8,069,431 B1 * | 11/2011 | Zhang ..................... G06F 30/34 716/128 |
| 8,122,106 B2 | 2/2012 | Hunt et al. |

(Continued)

OTHER PUBLICATIONS

Continuous Integration, Delivery and Deployment: A Systematic Review on Approaches, Tools, Challenges and Practices, IEEE, pp. 3909-3943 (Year: 2017).*

(Continued)

*Primary Examiner* — Anil Khatri
(74) *Attorney, Agent, or Firm* — Stephanie L. Carusillo

(57) ABSTRACT

A compliance discovery and integration process is implemented in association with a cloud-based security and compliance platform and associated CI/CD framework. The process assumes an existing DevOps-based deployment of a product, such as an enterprise application that executes in a runtime production environment. The technique of this disclosure addresses the problem of misalignment between a compliance policy and the product's post-deployment regulation posture by providing tools and methods that enable pro-active augmentation of governance and compliance policy during the pre-deployment phase and with respect to a next deployment of the product (e.g., a next or updated version). Thus, when the product is later deployed in its next deployment, its regulation posture (post-deployment) is already consistent with the compliance policy.

22 Claims, 5 Drawing Sheets

(56) References Cited

U.S. PATENT DOCUMENTS

| | | | |
|---|---|---|---|
| 8,141,030 B2* | 3/2012 | Finlayson | G06Q 10/063118 717/102 |
| 8,539,437 B2* | 9/2013 | Finlayson | G06F 21/6218 717/102 |
| 8,572,550 B2* | 10/2013 | Fox | G06F 8/70 717/100 |
| 8,660,878 B2* | 2/2014 | Bernardini | G06Q 10/06311 700/109 |
| 8,667,469 B2* | 3/2014 | Bernardini | G06F 8/36 717/126 |
| 9,207,931 B2* | 12/2015 | Fox | G06F 8/70 |
| 9,690,461 B2* | 6/2017 | Holler | G06F 8/34 |
| 9,690,557 B2 | 6/2017 | Srinivasamoorthy et al. | |
| 9,813,450 B1* | 11/2017 | Wasiq | H04L 63/20 |
| 9,836,629 B2 | 12/2017 | Tucker et al. | |
| 9,910,652 B2 | 3/2018 | Chen et al. | |
| 10,089,676 B1* | 10/2018 | Gupta | G06Q 30/0633 |
| 10,162,650 B2 | 12/2018 | Frank et al. | |
| 10,275,777 B2* | 4/2019 | Copeland | G06F 16/90335 |
| 10,318,265 B1* | 6/2019 | To | H04L 67/34 |
| 10,747,852 B1* | 8/2020 | Dalessio | G06F 21/10 |
| 11,145,458 B2* | 10/2021 | Kowase | H01G 4/30 |
| 11,151,020 B1* | 10/2021 | Bajoria | G06F 9/54 |
| 11,593,084 B2* | 2/2023 | Dinh | G06F 8/65 |
| 2020/0026510 A1* | 1/2020 | Adams | G06F 8/71 |

OTHER PUBLICATIONS

Fitzgerald et al, "Continuous Software Engineering and Beyond: Trends and Challenges", ACM, pp. 1-14 (Year: 2014).*

Rathod et al, "Test Orchestration A framework for Continuous Integration and Continuous Deployment", IEEE pp. 1-5 (Year: 2015).*

Chatzikonstantinou "Policy Modeling and Compliance Verification in Enterprise Software Systems : a Survey", IEEE, pp. 27-36 (Year: 2012).*

Burg et al, "Tracing Software Build Processes to Uncover License Compliance Inconsistencies", ACM, pp. 731-741 (Year: 2014).*

Suonsyrj a et al, "Objectives and Challenges of the Utilization of User-Interaction Data in Software Development", IEEE, pp. 357-361 (Year: 2018).*

Syed et al, "DEPO: A Platform for Safe DEployment of POlicy in a Software Defined Infrastructure"ACM, 98-111 (Year: 2019).*

* cited by examiner

DISCOVERING AND USING APPLICATION DEPLOYMENT DEPENDENCIES TO AUGMENT GOVERNANCE AND COMPLIANCE POLICY

BACKGROUND OF THE INVENTION

Technical Field

This disclosure relates generally to information technology configured to facilitate compliance to security and regulatory standards in an enterprise computing environment.

Background of the Related Art

Enterprises are embracing cloud technologies to drive innovation, modernize their Information Technology (IT) infrastructure, and ultimately, digitize their business. When it comes to hosting sensitive and regulated workloads on the public cloud, enterprises—particularly those in highly regulated industries—are required to manage security and compliance consistently and continuously. Regulated industries are often mandated to provide a certain level of observability, traceability and access of how features are delivered and managed in their runtime operational environment. This requires careful planning, development, testing, and enforcement of policies in the continuous delivery pipeline and in the runtime environment.

While enterprises are aware of this problem, typically a regulation posture can only be obtained post deployment, i.e., only in production environments, and thus the benefit that would otherwise be available through early compliance alignment of the enterprise's products and offerings is not possible. Getting the regulation posture post deployment also incurs costs due to requirements for reactive remediation. Developers need the support of compliance officers early in the product development lifecycle, e.g., to navigate the often large numbers of compliance control points that may impact the product or offering. Those compliance officers, however, are not familiar with the DevOps tools and processes used by the software supply chain pipelines. Thus, practical integration of governance and compliance decisions into the early product development lifecycle has not been possible.

The subject matter herein addresses this problem.

BRIEF SUMMARY

A compliance discovery and integration process is implemented in association with a cloud-based security and compliance platform and associated CI/CD framework. The process assumes an existing DevOps-based deployment of a product, such as an enterprise application that executes in a runtime production environment. The technique of this disclosure addresses the problem of misalignment between a compliance policy and the product's post-deployment regulation posture by providing tools and methods that enable pro-active augmentation of governance and compliance policy during the pre-deployment phase and with respect to a next deployment of the product (e.g., a next or updated version). Thus, when the product is later deployed in its next deployment, its regulation posture (post-deployment) is already consistent with the compliance policy.

In an exemplary embodiment, a method for continuous integration and deployment (CI/CD) in association with an enterprise application includes a discovery phase, and a deployment phase. The discovery phase occurs prior to a next deployment of the enterprise application. During this phase, one or more software supply chain (or "shift left" or "cicd") artifacts associated with a pipeline are discovered. For at least one software supply chain artifact, one or more tasks responsible for handling the software supply chain artifact, together with any associated dependencies, are also discovered. Based on the discovered information, one or more compliance control points associated with a governance and compliance policy are then adjusted or modified (or created if needed). In particular, and within the development side of the computing environment, one or more values associated with one or more policy check parameters associated with the compliance policy are adjusted or modified based on one or more of the discovered software supply chain artifact, the one more tasks, and any associated dependencies. The policy check parameter values may be provided using pre-defined or configured data, or based on responses or selections made by Compliance Officers or other similarly-situated individuals from a compliance side. After the discovery phase, the enterprise application is then deployed in a production environment.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION

Figure 1:
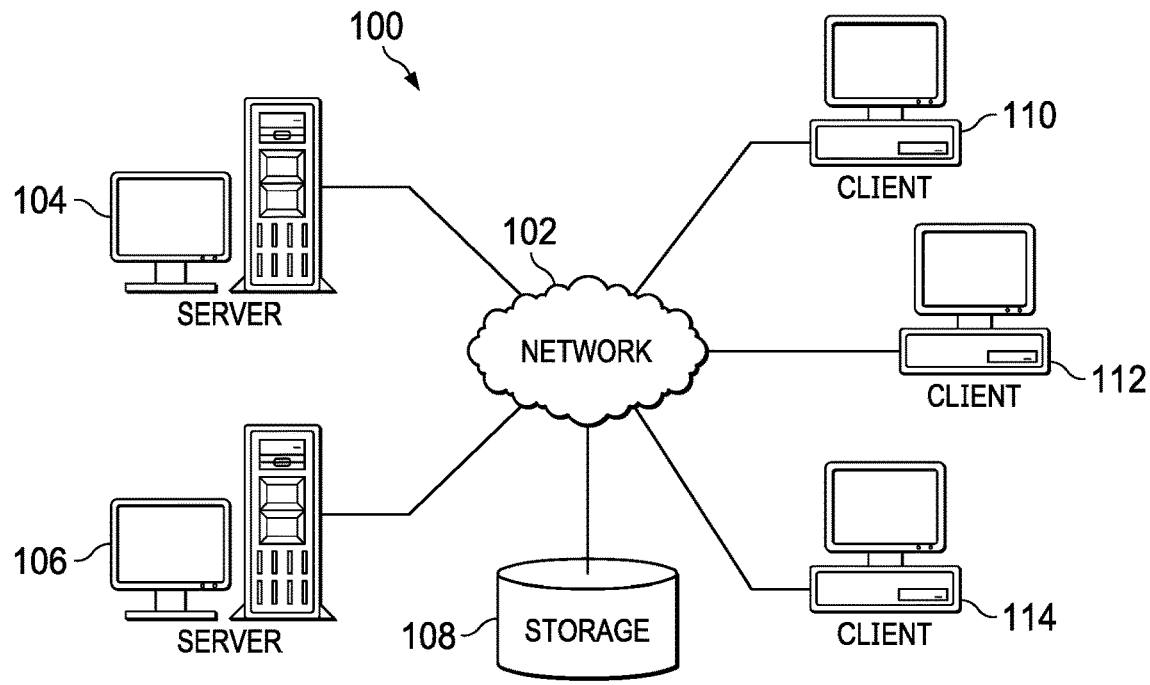
FIG. 1 depicts an exemplary block diagram of a distributed data processing environment in which exemplary aspects of the illustrative embodiments may be implemented.
Figure 2:
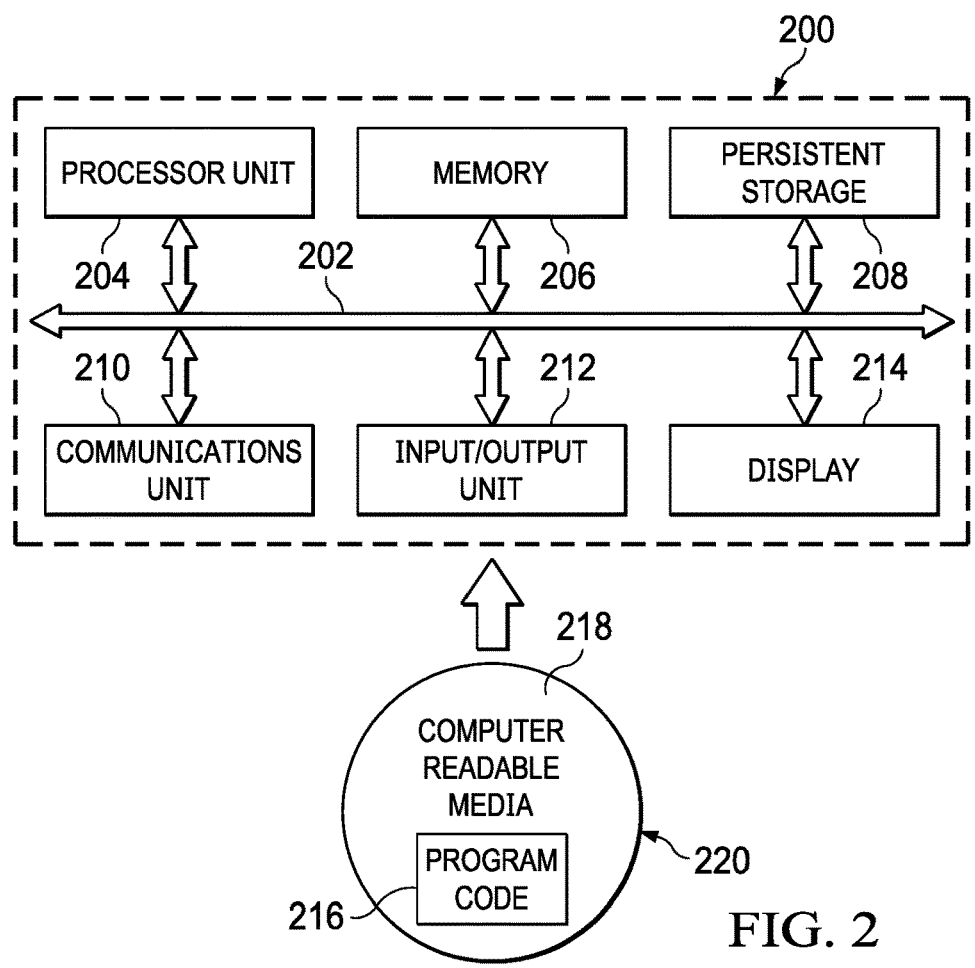
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Cloud Computing Model

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

In particular, typical characteristics are on-demand self-service, resource pooling, rapid elasticity, and measured service. The service models typically are: Software as a Service (SaaS), i.e. the capability provided to the consumer is to use the provider's applications running on a cloud infrastructure; Platform as a Service (PaaS), i.e. the capability provided to the consumer is to deploy onto the cloud infrastructure consumer-created or acquired applications created using programming languages and tools supported by the provider; and Infrastructure as a Service (IaaS), i.e. the capability provided to the consumer is to provision processing, storage, networks, and other computing resources where the consumer is able to deploy and run arbitrary software, which can include operating systems and applications. The deployment models typically are: private cloud, wherein the cloud infrastructure is operated solely for an organization; community cloud, wherein the cloud infrastructure is shared by several organizations and supports a specific community that has shared concerns (e.g., mission, security requirements, policy, and compliance considerations); public cloud, wherein the cloud infrastructure is made available to the general public or a large industry group and is owned by an organization selling cloud services; and hybrid cloud, wherein the cloud infrastructure is a composition of two or more clouds (private, community, or public) that remain unique entities but are bound together by standardized or proprietary technology that enables data and application portability.

A representative cloud computing node is as illustrated in FIG. 2 above.

Figure 3:
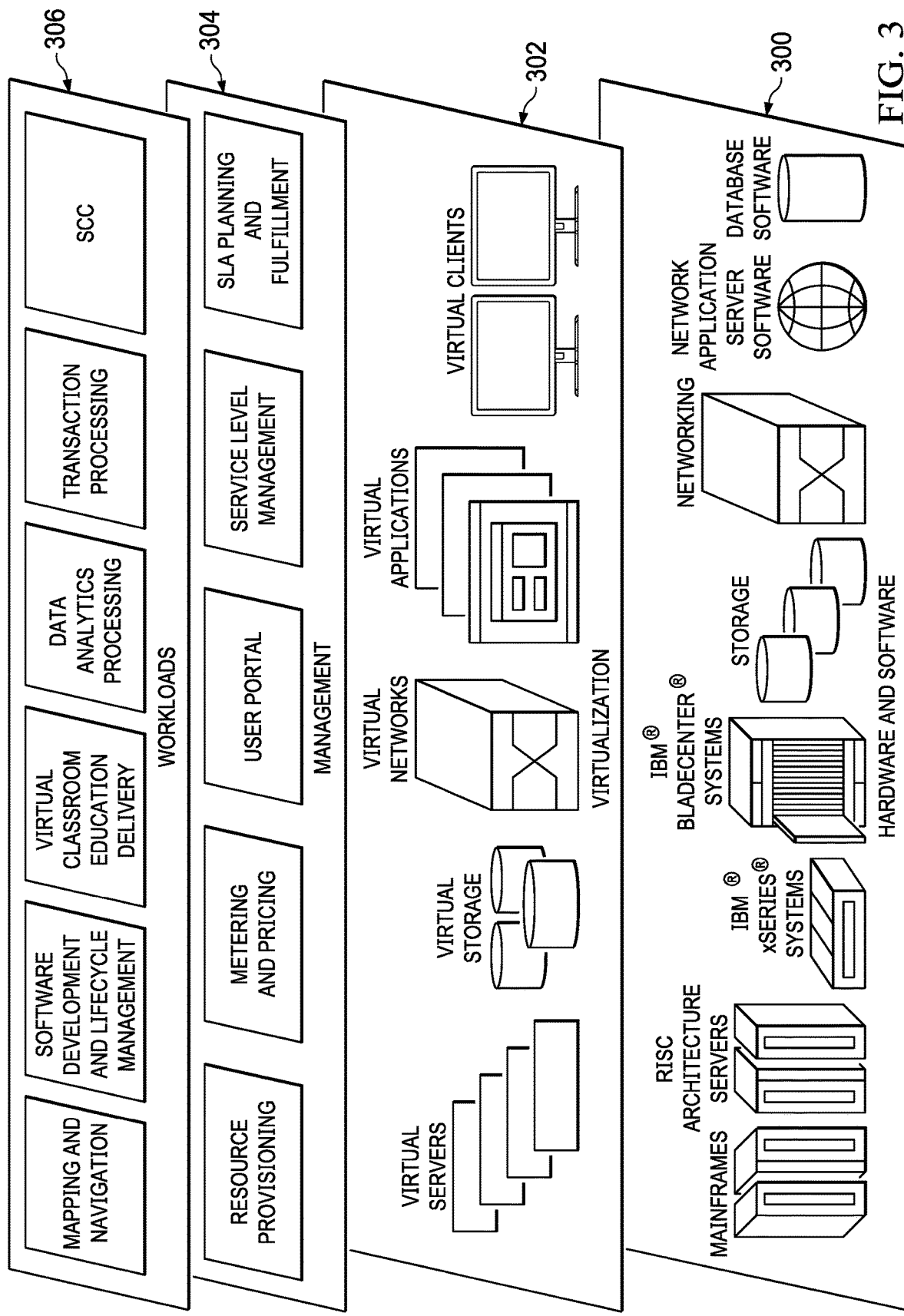
FIG. 3 depicts a representative cloud computing environment.

FIG. 3 depicts functional abstraction layers provided by a typically cloud computing environment is shown. Hardware and software layer 300 includes hardware and software components. Virtualization layer 302 provides an abstraction layer from which the following examples of virtual entities may be provided: virtual servers; virtual storage; virtual networks, including virtual private networks; virtual applications and operating systems; and virtual clients. Management layer 304 provides resource provisioning, metering and pricing, security, a portal, service level management, Service Level Agreement (SLA) planning and fulfillment, and the like. The workloads layer 306 provides functionality for which the cloud computing environment may be utilized. Examples of workloads and functions which may be provided from this layer include: mapping and navigation; software development and lifecycle management; virtual classroom education delivery; data analytics processing; transaction processing, and in the context of this disclosure, a Security and Compliance Center (SCC) platform.

As is also known, the notion of "cloud-native" is an approach to building applications that leverage foundational cloud computing technologies. The goal of cloud-native is to enable a consistent and optimal application development, deployment, management and performance across public, private and multi-cloud environments. Today, cloud-native applications are typically built using microservices, deployed in containers, and operated (at scale) using an orchestration platform for scheduling and automating the deployment, management and scaling of containerized applications. Microservices are loosely-coupled, independently deployable components that have their own self-contained stack, and that communicate with each other via REST APIs, event streaming or message brokers. Containers are executable units of code that contain all the code, runtimes and operating system dependencies required to run the application. For most organizations, containers are synonymous with Docker containers, but other container types exist. A representative container orchestration platform is Kubernetes, which is available as open source.

DevOps

DevOps (a portmanteau of "development" and "operations") is a software development method that stresses communication, collaboration, integration, automation and measurement of cooperation between software developers and other information-technology (IT) professionals. DevOps acknowledges interdependence of software development, quality assurance, and IT operations, and aims to help an organization rapidly produce software products and services and to improve reliability and security while providing faster development and deployment cycles. A continuous integration and deployment (CI/CD) pipeline is an automated set of processes utilized as part of or integrated into software development and operations (DevOps). The CI/CD pipeline is composed of several stages. In one embodiment, the stages may include Build, Test, and Deploy Development, Integration Tests, Compliance Checks, and Deploy Product. In another embodiment, the stages may include Commit, Build, Test, Stage, and Deploy and collectively span development to production or delivery. Each of the stages is comprised of one or more actions or options. For example, the Test stage may employ a simple tester, an advanced tester, and/or a compliance scanner. In one embodiment, one or more stages of the pipeline may only require a selection of less than all of the available actions, to avoid redundancy and inefficiency. The CI/CD pipeline automates the building, testing, and deployment stages.

An example of a pipeline template with stages and corresponding tools is shown and described in FIG. 2. Each of the stages is comprised of one or more actions or options. For example, the Test stage may employ a simple tester, an advanced tester, and/or a compliance scanner. In one embodiment, the pipeline stage may only require a selection of less than all of the available actions, to avoid redundancy and inefficiency. To address the action identification in the CD pipeline, one or more intents are identified and mapped to the pipeline stages to facilitate action requirements and corresponding identification. The intent is referred to as a non-functional requirement that characterizes or otherwise articulates features corresponding to the pipeline stage(s) and reflected in the functional aspects. In one embodiment, the intent may be specified in corresponding documentation. Accordingly, the intent identification and application to the CD pipeline enhances the functional identification of actions in one or more pipeline stages.

Figure 4:
FIG. 4 depicts an example CI/CD pipeline template.

This representative pipeline template thus defines a framework for program code development. The pipeline template includes multiple stages, with each stage having one or more corresponding actions that are expected or required for the program code development. Referring to FIG. 4, the example pipeline template (410) includes several stages: Build (420), Unit Test (430), Deploy Dev (440), Integration Tests (450), Compliance Checks (460), and Deploy Product (470). Each stage of the pipeline template has a selection of tools to support the general category represented in the corresponding stage. For example, the Build stage (420) is shown with four optional tools (422), (424), (2426), and (428), the Unit Test stage (430) is shown with two optional tools (432) and (434), the Deploy Development stage (440) is shown with two optional tool (442) and (444), the Integration Tests stage (450) is shown with three optional tools (452), (454), and (456), the Compliance Checks stage (460) is shown with two optional tools (462) and (464), and the Deploy Product stage (470) is shown with tool (472). The template, stages, and tools are an example of the pipeline template and should not be considered limiting. In one embodiment, the Push to Runtime tool (472) in the Deploy Product stage (470) functions to organize the selected tools represented in the pipeline stages into executable program code. Accordingly, the pipeline template is a platform that encapsulates a model for program code development, with the model referred to herein as a pipeline.

Generalizing, the notion of continuous delivery requires that code changes constantly flow from development all the way through to production. To continuously deliver in a consistent and reliable way, a team must break down the software delivery process into delivery stages and automate the movement of the code through the stages to create a delivery pipeline. A delivery pipeline is so-named because it allows code to flow through a consistent, automated sequence of stages where each stage in the sequence tests the code from a different perspective. Each successive stage becomes more production-like in its testing and provides more confidence in the code as it progresses through the pipeline. While each stage is either building or testing the code, the stage must have the necessary automation to not only run the test but also to provision, deploy, set up, and configure the testing and staging environments. The code should progress through each stage automatically. The goal is to strive for unattended automation that eliminates or minimizes human intervention.

Typically, creating even a simple delivery pipeline involves multiple automation tools and frameworks. Most automated delivery pipelines include at least tools in these categories: source-code management (tools include Git and Subversion); Build (tools include Ant, Make, Maven, and Gradle); Continuous integration (CI) server (tools include Jenkins and Travis-CI); Configuration management (tools include Ansible, SaltStack, Chef, and Puppet); Deployment and provisioning (tools include IBM® UrbanCode® Deploy, Bamboo, and Chef); and Testing frameworks, which tend to be programming-language specifice (tools include xUnit, Behave, and Selenium). Most pipelines also include an artifact repository where the output of the build stage (e.g., binaries and install packages) is stored. Various stages of the pipeline either get or put items there. A final aspect of building a delivery framework is developing an orchestration framework that ties all of the tools together. For example, IBM® Cloud Continuous Delivery is a framework that includes toolchains, which are sets of integrated tools, such as Delivery Pipeline and GitHub.

Although pipelines can differ from one another in various way, several common stages are applicable to most projects, namely: build, staging, and production. In the build stage, the software is built, packaged, and archived. Unit tests are run. The input for the build stage is typically a source-code repository. The output of this stage is sometimes referred to as a build artifact that is stored in an artifact repository. The build stage is often configured to trigger on changes in the source-code repository. In staging, the build artifact is installed or deployed into a staging environment that is a clone of the production environment. Automated tests are run to verify the new version. Functional tests or integration tests are run on new capabilities. Regression tests are run to ensure that the new version does not break any capabilities. Finally, performance tests are run. In the production stage, the software is installed or deployed into the production environment. Additional tests are run to ensure that the new version is working as expected. In simple pipelines, the stages are run sequentially. In complex pipelines, multiple instances of some stages can exist, in which cause production stages are then run in parallel. Typically, early stages should be very simple and run very fast to provide rapid feedback. Later stages run progressively more complex tests in a progressively more production like environment.

Without intending to be limiting, the techniques such as described above may be implemented in association with a cloud-based security and compliance platform where, for example, customers define controls, assess posture, monitor security and compliance, remediate issues, and collect audit evidence. To this end, the cloud platform provides a Security and Compliance Center (SCC) network-accessible dashboard that enables a user (customer) to view and automate its security and compliance postures, to enable configuration governance, and to detect vulnerabilities and threats. For example, the dashboard enables the customer to manage configuration rules that define provisioned resources' rules to standardize configurations, to choose predefined profiles (and associated predefined groups of controls) to ensure best practices, to create and manage custom profiles to select specific controls to meet regulatory standards, to identify anomalies by monitoring network and user behavior, to download results as a report for audit evidence, and to configure custom tools to manage security findings. A representative SCC is IBM Cloud® Security and Compliance Center, although this cloud service is not intended to be limiting. Preferably, any functionality that is exposed as a cloud service, e.g., in a cloud computing environment such as described above with respect to FIG. 3, may be used. In the alternative, the platform functions described herein may execute in a standalone (e.g., on-premises) networking environment.

Software Supply Chain Compliance Ecosystem

With the above as background, the techniques of this disclosure are now described.

According to this disclosure, product deployment dependencies on continuous integrations and continuous testing are discovered in advance of a next deployment, with the discovered information then being used for governance and compliance policy content adjustment, e.g., with input from Compliance personnel. Policy adjustments on the governance and compliance side are then automatically reflected on the CI/CD side when the product is next deployed.

Figure 5:
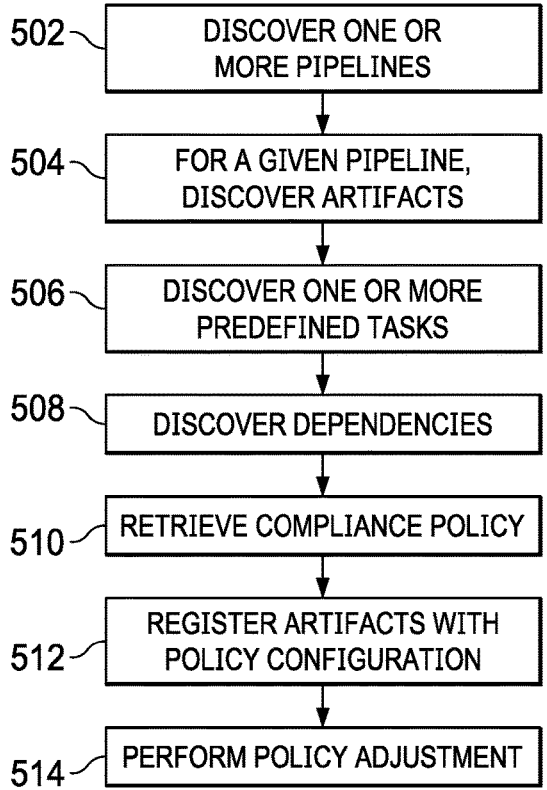
FIG. 5 depicts a high level process flow of the technique of this disclosure.

FIG. 5 depicts a high level process flow of the technique of this disclosure, which process may be implemented in association with a cloud-based security and compliance platform and associated CI/CD framework, all as previously described. The technique assumes an existing DevOps-based deployment of a product, such as an enterprise application that executes in a runtime production environment. The nature and type of product is not a limitation of this disclosure, although it is presumed that one or more enterprise governance and compliance policies are potentially implicated by such runtime execution. In a typical prior art implementation, whether and to what extent any governance and compliance policy is affected by such execution is unknown prior to deployment of the product in its production environment. This is because product developers may implement various functions and features of the product without necessarily having any knowledge regarding how such functionality impacts compliance. The technique of this disclosure addresses the problem of misalignment between a compliance policy and the product's post-deployment regulation posture by augmenting governance and compliance policy creation during the pre-deployment phase and with respect to a next deployment of the product (e.g., a next or updated version). Thus, when the product is later deployed in its next deployment, its regulation posture (post-deployment) is already consistent with the compliance policy.

The process begins at step 502 (pre-deployment) by discovering one or more pipelines for the product, typically based on the credentials of a developer or other user of the system. At step 504, and for a given pipeline of interest, one or more software supply chain artifacts for that pipeline are discovered. These software supply chain artifacts are sometimes referred to herein as "shift left" or "cicd" artifacts, referring to the notion that these artifacts are discovered in the pre-deployment phase. A software supply chain artifact typically is machine-readable, but it may also include any other constructs (e.g., documents) that can dealt with in a programmatic manner. Typically, step 504 utilizes runtime monitoring artifacts (e.g., properties, parameters, vulnerabilities, code lists, etc.) to discover the corresponding one or more software supply chain artifacts mapping to runtime. During this operation, certain use cases (e.g., involving just naming differences that might be expected) are ignored. At step 506, one or more pre-defined tasks handling the software supply chain artifacts identified in step 504 are then discovered. In one embodiment, the pre-defined tasks are identified using task templates (e.g., Tekton jobs, Terraform processes, Continuous Testing (CT) checks, etc.). In the alternative, pre-defined annotations on tasks are used to determine what resources are being manipulated by the task; these annotations can also be used for traceability. At step 508, one or more dependencies for the software supply chain artifacts are discovered. The nature and type of dependencies depend on implementation but typically include, without limitation, swagger API documents, files for OPA (Open Policy Agent) as code, vulnerabilities documents, etc. At step 510, and after the information (namely, pipeline artifacts, tasks and dependencies) from steps 502, 504 and 506 is discovered, a Governance and Compliance policy configuration is retrieved. At step 512, the list of software supply chain artifacts discovered in the pipeline is registered with the policy configuration. At step 514, the policy, as adjusted (customized) to reflect the identified artifacts, is orchestrated, e.g., using tooling in the Governance and Compliance side.

The discovery process itself may be iterative. In other words, a particular discovery operation may provide a first level (or degree) of discovery, and based on the discovered information, a further second level (or degree) of discovery may then be carried out with respect to the information discovered in the first level. Thus, as used herein the notion of discovery is recursive such that information discovery within a particular level may then be used to facilitate more fine-grained discovery at that level, and so on.

Figure 6:
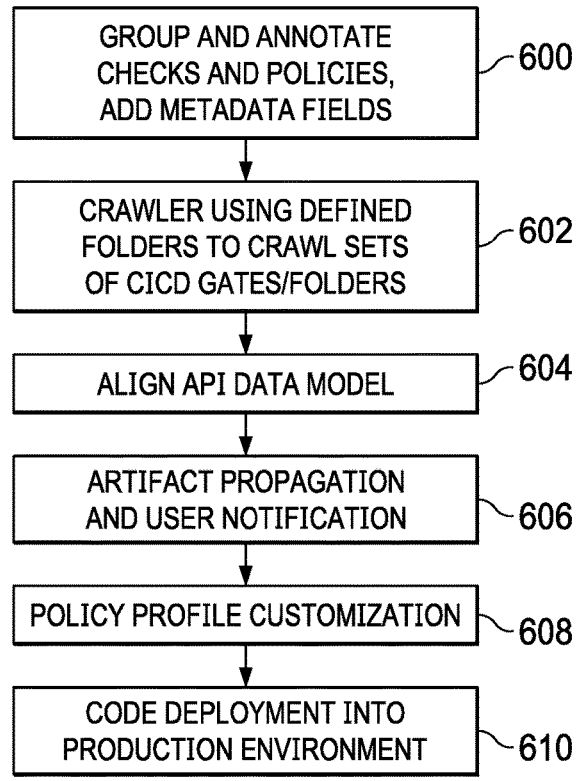
FIG. 6 depicts a preferred iterative workflow that enables pro-active augmentation of governance and compliance policy during a pre-deployment phase and with respect to a next deployment of a product according to the techniques of this disclosure.

The process can iterate on a continuous basis to ensure that the compliance and production environments remained aligned with respect to the product's post-deployment regulation posture. FIG. 6 depicts this type of continuous workflow. At block 600, and as a pre-requisite to CI/CD deployment policy checks, directories (folders) that map to controls and sub-controls are grouped and annotated to identify one or more policy checks that will be carried out in the discovery process. The annotations may also include metadata fields that point to the SCC pipeline registration. The security controls and sub-controls may be NIST 800-53 security controls. As is well-known, the NIST 800-53 standards and guidelines provide a comprehensive set of security controls, and many state and federal organizations implement this framework to help ensure the security and privacy of governmental infrastructures and data they manage. According to this standard, the security controls are defined by control groups, such as AC (Access Control), AT (Awareness and Training), AU (Audit and Accountability), CM (Configuration Management), and many more. Although not intended to be limiting, control-based information typically is expressed in an SCC operating environment using OSCAL (Open Security Controls Assessment Language), which is a set of formats expressed in XML, JSON and YAML. OSCAL was developed by NIST and provide machine-readable representations of control catalogs, control baselines, system security plans, and assessment plans and results. Control-based information expressed using USUAL formats enables easy access of control information from security and privacy control catalogs, the sharing of machine-readable control baselines, maintaining and sharing actionable, up-to-date information about how controls are implemented in the customer's systems, and automating monitoring and assessment of the effectiveness of the customer's controls.

Returning back to FIG. 6, at block 602, a crawler function is implemented to begin the discovery process. The crawler used the folders defined in block 600 to crawl one or more sets of CD/CD policy check gates/folders, e.g., to identify modified checks, new checks and new gates. When a developer or tester modifies or adds checks into a folder, the crawler detects the delta (change) in CI/CD and automatically reflects that change in the pipeline's SCC registration. The information identified by the crawler 602 is then aligned with an API-based data model at block 604. In particular, this operation aligns concepts (e.g., an API declaration) in CI/CD and SCC with existing services artifacts. This operation corresponds to step 602 in FIG. 4 wherein runtime compliance artifacts (properties, parameters, vulnerabilities, codes, lists, etc.) are associated with the software supply chain artifacts corresponding to the API-named data model concepts. The API-named data model enables the policy configuration to be based on an ontology for naming alignment. After API data model alignment, the discovered artifacts are propagated at block 606. At this operation, new or modified checks are registered, e.g., in associated Government and Compliance policy data, and the new folders (as identified in block 602) are registered in the SCC toolchain compliance template. Also, the new or modified checks (from block 602) are annotated with the runtime compliance artifacts (from block 604) to associate them for security findings correlation. In one embodiment, a publish/subscribe (pub/sub) system, email or Slack notification to the Compliance Officer may be used for this purpose. Following artifact propagation and notification to the user (e.g., the Compliance Officer), the policy is then customized for regulation compliance at block 608. In particular, at this point the new or modified checks and the new folders (from block 602) are part of the SCC compliance toolchain. In one embodiment, the Compliance Officer, prompted by the notification in block 606, then selects one or more custom values relevant to a particular customer, regulation, or the like. A preferred approach, policy check parameters are auto-populated with pre-defined or configured custom values, e.g., from customer- or regulation-specific templates, and these custom values are defined in advance (e.g., before profiling of the developer's pipeline checks). As described above, the customized policy profile is then used for a next deployment to facilitate continuous compliance automation. As also indicated in FIG. 6, the customized profile is also returned to block 600, where the workflow may then be iterated continuously.

After the update of the policy with the newly-discovered items and before applying the new policy in production after the deployment of the new code, the new policy (as vetted by the Compliance Officer) may be used on the compliance side to validate that the shift left/software supply code itself is compliant.

In a preferred embodiment, a particular block in FIG. 6 is implemented using automation, e.g., a software-based widget executed in hardware. The may be one or more widgets used to crawl, propagate and customize the cicd policy checks for compliance regulations parameters.

Figure 7:
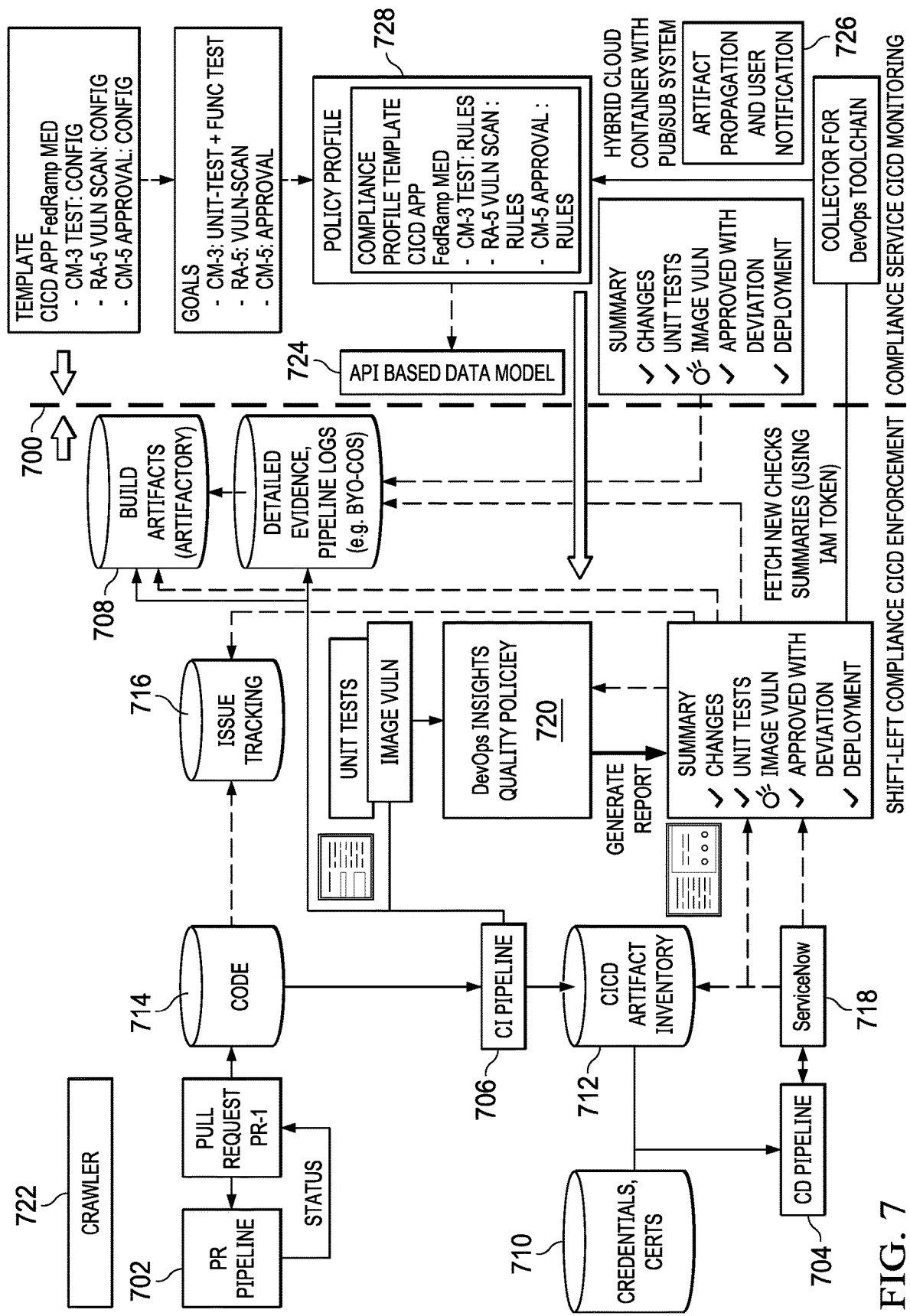
FIG. 7 depicts an implementation of the workflow shown in FIG. 6 in association with a CI/CD operating environment.

FIG. 7 depicts an implementation of the workflow shown in FIG. 6 within an cloud-based continuous delivery framework such as IBM® Cloud Continuous Delivery. In this example environment, CI/CD enforcement occurs on the left side of the dividing line 700, and CI/CD monitoring is occurs on the right side thereof. These activities typically occur within one or more hybrid cloud containers. Several pipelines including a provisioning (PR) pipeline 702, a continuous delivery (CD) pipeline 704, and a continuous integration (CI) pipeline 706 are shown. Build artifacts output from CI pipeline 706 are stored in an associated database 708. Databases includes a credentials and certificates database 710, and a CICD artifact inventory database 712. The code being developed is shown at 714. Various services are used in the development environment including issue tracking 716, service management 718, and a tool 720 (e.g., IBM® DevOps Insights) that aggregates code, test, build and deployment data to provide visibility of quality for DevOps teams. As noted above, the discovery process involves a crawler function, depicted here as CICD Validations crawler 722 that examines known sets of cicd check gates/folders for modified checks, new checks and new gates. As was described in the FIG. 6 workflow, the new or modified checks/folders are then registered, conformed to the API-based data model 724, and subject to artifact propagation and user notification 726. The adjusted policy profile 728 that results from this processing is then returned back to the insights tool 720.

It is not always the case that software supply chain artifacts will be discovered during the discovery phase. This may occur, for example, where the CI/CD deployment file standard is per a pipeline blueprint type. In this case, preferably the system mirrors policy artifacts from runtime into the CI/CD repository, e.g., by populating the configuration as a code deployment file. As a specific example, a generic Tekton job that runs an OPA container may be used to dynamically populate the policy at job time to test the artifacts in the deployment file. In the typical case, however, the discovery will enable one or more dependencies, such as when SDKs enable changes to the runtime environment directly. In this typical case, and as described above, the SDK artifacts used in the code are discovered. These discovered artifacts are then exposed as parameters into the pipeline policies and applied in the runtime compliance configuration in an earlier CI/CD promotion environment (e.g., staging or pre-production).

The technique of this disclosure provides significant advantages. As explained above, the approach herein augments governance and compliance policy data to match the granularity of configuration as a code enablement in DevOps to mark and select the hierarchical structure of application/data/infrastructure parameters that are relevant to one or more regulations. The approach enables effective discovery of the product deployment dependencies on continuous integrations and testing to share one or more artifacts hosting or handling the parameters relevant to regulations and the policy logic. Using this discovery, governance and compliance decisions are bridged to DevOps policy configuration to propagate the compliance officer decisions to the early product development lifecycle. The approach enables full software lifecycle compliance alignment across the CI/CD-SCC (GRC)-CI/CD loop. The compliance alignment (to real-time and industry concepts) is carried out across various CI/CD artifacts/tools, and with respect to standard/data models. The approach herein is readily implemented using widgets to crawl, propagate and customize cicd policy checks for compliance regulations parameters.

As noted above, preferably the techniques herein are performed in a cloud computing environment (FIG. 3), or otherwise leverage cloud-compute resources.

Any of the endpoint, parser, translation, augmentation and/or loader functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

The techniques herein are not limited to use with a microservices-based application, although this type of application implementation benefits significantly from the approach. Indeed, the approach benefits any application implementation that performs authorization including, without limitation, those based on monolithic models, object-oriented models, and others.

More generally, computing devices within the context of the disclosed invention are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, SAML, WS-Trust, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures other than cloud-based infrastructures. These include, without limitation, simple n-tier architectures, web portals, federated systems, and the like.

Still more generally, the subject matter described herein can take the form of an entirely hardware embodiment, an entirely software embodiment or an embodiment containing both hardware and software elements.

Furthermore, the user impersonation/delegation functionality described herein can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, one or more of the modules or runtime-based components are implemented in a special purpose computer, preferably in software executed by one or more processors. The software also is maintained in one or more data stores or memories associated with the one or more processors, and the software may be implemented as one or more computer programs.

The SCC functionality may be implemented as an adjunct or extension to an existing security (authentication) service, or access manager solution. The technique also may be implemented in an automated manner, as has been described.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques herein provide for improvements to another technology or technical field, e.g., continuous integration and deployment (CI/CD) pipelines and orchestration, continuous compliance of security and regulatory requirements.

What is claimed is as follows:

1. A method for continuous integration and deployment (CI/CD) in association with an enterprise application in a computing environment, comprising:
    in association with a sequence of automated stages comprising a CI/CD pipeline, and prior to a next deployment of the enterprise application, the enterprise application comprising code that passes through the sequence of automated stages during its development:
        discovering one or more software supply chain artifacts associated with the pipeline;
        for at least one software supply chain artifact, discovering one or more tasks responsible for handling the software supply chain artifact, together with any associated dependencies;
        retrieving a compliance policy associated with a development side of the computing environment;
        registering the discovered software supply chain artifact, the one or more tasks, and the one or more associated dependencies with the compliance policy; and
        within the development side of the computing environment, and based on at least one of the discovered software supply chain artifact, the one more tasks, and the one or more associated dependencies, updating one or more values associated with one or more policy check parameters associated with the compliance policy, wherein the one or more values associated with one or more policy check parameters are updated in an automated manner using pre-defined or pre-configured values; and
    thereafter, deploying the enterprise application in a production environment.

2. The method as described in claim 1 wherein discovering the one or more software supply chain artifacts includes identifying one or more runtime monitoring artifacts.

3. The method as described in claim 2 wherein the one or more runtime monitoring artifacts include one of: properties, parameters, vulnerabilities, codes and lists.

4. The method as described in claim 1 wherein at least one associated dependency is associated with an Application Programming Interface (API)-named data model.

5. The method as described in claim 1 wherein the one or more values associated with one or more policy check parameters are updated responsive to receipt of values identified by compliance personnel within a compliance side of the computing environment, the compliance side being distinct from the development side.

6. The method as described in claim 1 wherein at least one discovery operation is recursive.

7. The method as described in claim 1 wherein the software supply chain artifact is a Software Development Kit (SDK) artifact, the SDK enabling direct changes to the computing environment.

8. The method as described in claim 1 further including validating that the enterprise application is compliant with the compliance policy as updated prior to deployment of the enterprise application in the production environment.

9. Apparatus, comprising:
    at least one hardware processor;
    computer memory holding computer program instructions executed by the at least one hardware processor for continuous integration and deployment (CI/CD) in association with an enterprise application in a computing environment, the computer program instructions comprising program code configured in association with a sequence of automated stages comprising a CI/CD pipeline to:
        prior to a next deployment of the enterprise application, the enterprise application comprising code that passes through the sequence of automated stages during its development:
            discover one or more software supply chain artifacts associated with the pipeline;
            for at least one software supply chain artifact, discover one or more tasks responsible for handling the runtime artifact, together with any associated dependencies;
            retrieve a compliance policy associated with a development side of the computing environment;
            register the discovered software supply chain artifact, the one or more tasks, and the one or more associated dependencies with the compliance policy; and
            within the development side of the computing environment, and based on at least one of: the discovered software supply chain artifact, the one more tasks, and the one or more associated dependencies, update one or more values associated with one or more policy check parameters associated with the compliance policy, wherein the one or more values associated with one or more policy check parameters are updated in an automated manner using pre-defined or pre-configured values; and
        thereafter, deploy the enterprise application in a production environment.

10. The apparatus as described in claim 9 wherein the program code configured to discover the one or more software supply chain artifacts includes program code to identify one or more runtime monitoring artifacts.

11. The apparatus as described in claim 10 wherein the one or more runtime monitoring artifacts include one of: properties, parameters, vulnerabilities, codes and lists.

12. The apparatus as described in claim 9 wherein at least one associated dependency is associated with an Application Programming Interface (API)-named data model.

13. The apparatus as described in claim 9 wherein the one or more values associated with one or more policy check parameters are updated responsive to receipt of values identified by compliance personnel within a compliance side of the computing environment, the compliance side being distinct from the development side.

14. The apparatus as described in claim 9 wherein at least one discovery operation is recursive.

15. The apparatus as described in claim 9 wherein the program code is further configured to validate that the enterprise application is compliant with the compliance policy as updated prior to deployment of the enterprise application in the production environment.

16. A computer program product in a non-transitory computer-readable medium for use in a data processing system, the computer program product holding computer program instructions executed by the data processing system for continuous integration and deployment (CI/CD) in association with an enterprise application in a computing environment, the computer program instructions comprising program code configured in association with a sequence of automated stages comprising a CI/CD pipeline to:
    prior to a next deployment of the enterprise application, the enterprise application comprising code that passes through the sequence of automated stages during its development:
        discover one or more software supply chain artifacts associated with the pipeline;
        for at least one software supply chain artifact, discover one or more tasks responsible for handling the software supply chain artifact, together with any associated dependencies;
        retrieve a compliance policy associated with a development side of the computing environment;
        register the discovered software supply chain artifact, the one or more tasks, and the one or more associated dependencies with the compliance policy; and
        within the development side of the computing environment, and based on at least one of the discovered software supply chain artifact, the one more tasks, and the one or more associated dependencies, update one or more values associated with one or more policy check parameters associated with the compliance policy, wherein the one or more values associated with one or more policy check parameters are updated in an automated manner using pre-defined or pre-configured values; and
    thereafter, deploy the enterprise application in a production environment.

17. The computer program product as described in claim 16 wherein the program code configured to discover the one or more software supply chain artifacts includes program code to identify one or more runtime monitoring artifacts.

18. The computer program product as described in claim 17 wherein the one or more runtime monitoring artifacts include one of: properties, parameters, vulnerabilities, codes and lists.

19. The computer program product as described in claim 16 wherein at least one associated dependency is associated with an Application Programming Interface (API)-named data model.

20. The computer program product as described in claim 16 wherein the one or more values associated with one or more policy check parameters are updated responsive to receipt of values identified by compliance personnel within a compliance side of the computing environment, the compliance side being distinct from the development side.

21. The computer program product as described in claim 16 wherein at least one discovery operation is recursive.

22. The computer program product as described in claim 16 wherein the program code is further configured to validate that the enterprise application is compliant with the compliance policy as updated prior to deployment of the enterprise application in the production environment.

* * * * *